United States Patent [19]

Huba et al.

[11] 4,331,525

[45] May 25, 1982

[54] ELECTROLYTIC-ULTRAFILTRATION APPARATUS AND PROCESS FOR RECOVERING SOLIDS FROM A LIQUID MEDIUM

[75] Inventors: Francis Huba, Mentor; Roman Zorska, University Heights, both of Ohio

[73] Assignee: Diamond Shamrock Corporation, Dallas, Tex.

[21] Appl. No.: 190,632

[22] Filed: Sep. 25, 1980

Related U.S. Application Data

[63] Continuation-in-part of Ser. No. 93,671, Nov. 13, 1979, abandoned.

[51] Int. Cl.$^3$ .................. C25D 13/04; C25D 13/14; C25D 13/16
[52] U.S. Cl. .................. 204/181 F; 204/300 EC; 204/180 R
[58] Field of Search ......... 204/180 P, 181 F, 300 EC, 204/180 R

[56] References Cited

U.S. PATENT DOCUMENTS

| | | | |
|---|---|---|---|
| 3,424,663 | 1/1969 | Weigel | 204/181 F |
| 3,436,326 | 4/1969 | Stober | 204/181 F |
| 3,449,227 | 6/1969 | Heron et al. | 204/181 F |
| 3,663,402 | 5/1972 | Christenson et al. | 204/181 R |
| 3,663,403 | 5/1972 | Christenson et al. | 204/181 |
| 3,663,405 | 5/1972 | Christenson et al. | 204/181 R |
| 3,663,406 | 5/1972 | Christenson et al. | 204/181 |
| 3,664,938 | 5/1972 | Thomas et al. | 204/180 R |
| 3,956,114 | 5/1976 | Del Pico et al. | 210/23 F |
| 3,980,547 | 9/1976 | Kunkle | 204/301 |
| 4,107,026 | 8/1978 | Freeman | 204/300 R |
| 4,168,222 | 9/1979 | Freeman | 204/300 R |
| 4,207,158 | 1/1980 | Freeman | 204/180 R |

FOREIGN PATENT DOCUMENTS

| | | |
|---|---|---|
| 934324 | 9/1973 | Canada . |
| 968743 | 6/1975 | Canada . |
| 52-18788 | 12/1977 | Japan . |
| 1525103 | 9/1978 | United Kingdom . |

*Primary Examiner*—Howard S. Williams
*Attorney, Agent, or Firm*—Walter C. Danison, Jr.

[57] ABSTRACT

A process and apparatus for the recovery of suspended solids from a liquid medium is disclosed. The liquid medium containing suspended solids is circulated through an electrolytic cell and an ultrafiltration unit, the suspended solids being removed from the liquid medium as a uniform particulate mass of low liquid content while a proportionate amount of the liquid and dissolved components such as surfactants is removed through ultrafiltration to avoid a dilution of the liquid medium in a continuous process. The recovered solids, following evaporation of a small amount of remaining liquid, offers a more uniform particle size as well as substantially lower recovery costs when compared with conventional techniques, such as spray-drying, now used in the industry. The disclosed electrolytic-ultrafiltration process offers application to the treatment of industrial products and wastes (polymeric, e.g., PVC and PVC copolymers, rubber, paint, cellulose, paper sludge, food, etc.) and the recovery or concentrating of valuable materials from naturally occuring sources, e.g., whey protein.

25 Claims, 5 Drawing Figures

ELECTROLYTIC-ULTRAFILTRATION APPARATUS AND PROCESS FOR RECOVERING SOLIDS FROM A LIQUID MEDIUM

CROSS-REFERENCE TO RELATED APPLICATION

This application is a continuation-in-part of copending application Ser. No. 093,671, filed on Nov. 13, 1979, now abandoned.

BACKGROUND OF THE INVENTION (1) Field of the Invention

This invention relates to the electrolytic recovery of solids from liquid media where at least a portion of the liquid media may be simultaneously filtered, most preferably by circulation through an ultrafiltration unit to maintain a relatively constant solids concentration in the electrolytic cell; and to the apparatus used to achieve the separation of the above-mentioned solids from liquid media.

(2) State of the Art

The separation of suspended solids from a liquid has historically been achieved by such well-known methods as filtration or centrifuging. There are, however, a great number of solid-liquid compositions where these simple techniques do not achieve the desired separation or no separation at all. Examples of such solid-liquid compositions are polymer latex and emulsion compositions, particularly compositions containing polymer particles of small particle size (less that 1 to 2 microns), colloidal suspensions, compositions where solid particles have a high affinity for the liquid or solvent or where these more simple techniques cause processing problems such as agglomeration. Several processes have been proposed to effect the separation of these "special" solid-liquid compositions. Among these are freeze-thaw techniques, extrusion drying and spray-drying. Of these, spray-drying is probably the most effective and most widely used technique, particularly with emulsion resins. The spray-drying process, however, requires substantial amounts of energy in order to raise the material to the liquid vaporization temperature and also to overcome the heat of vaporization of the liquid, e.g., water. In this present era of dwindling energy supplies, a less energy intensive recovery and drying process would be extremely desirable. Another problem encountered with techniques such as spray-drying is that there is commonly a broad particle size distribution range for the dried solid. While this may not be critical in many applications, size classification is important in some of the more refined applications of the dried solids usage such as in PVC plastisols. Hence, a solids recovery process which would result in particles of more uniform size would be extremely useful for specialized applications such as the above-mentioned plastisols which generally require particle sizes less than about 2 microns.

Electrophoretic techniques have been suggested for the recovery of suspended solids from liquid compositions to save energy, give better control of size classification and to provide a more economical recovery process. Electrophoretic techniques have long been used for depositing paint material coatings onto electrically conductive substrates, and more recently these techniques have been used in the electrolytic deposition of various solids on an anode. For example, British Pat. No. 1,525,103 discloses a method of concentrating polyvinyl chloride (PVC) emulsion which comprises the steps of electrolytically attracting the solids towards an anode which is covered with a porous nonconductive element so that the solids of PVC are deposited on the element and then removing the deposited solids from the porous element. In this process, PVC, as in electrolytic depositions, is acidic and has to be neutralized in a separate step and vessel after removal from the membrane. U.S. Pat. No. 3,664,938 illustrates the recovery of polymer fines, specifically polyacrylamide, by subjecting a water-in-oil suspension to an electrical field where the polymer fines deposit on an electrode and are removed. U.S. Pat. No. 4,146,455 teaches treating liquid whey by subjecting raw whey to forced flow electrophoresis to effect the separation of lactose and simultaneously concentrate the solids in the resulting product whey solution. U.S. Pat. No. 4,110,189 illustrates the electrokinetic separation of finely divided clay particles from an aqueous suspension thereof.

U.S. Pat. No. 3,449,227 illustrates the manufacture of asbestos articles by electrodepositing asbestos fibers from a continuously circulated dispersion onto an electrode. U.S. Pat. No. 3,436,326 disloses the removal of waste solids from an aqueous system by electroplating said solids on a positively charged screen which screen must be removed to be cleaned. U.S. Pat. No. 3,424,663 teaches the electrophoretic deposition of a synthetic resin onto a metallic substrate from an aqueous solution to produce an adherent coating. The disclosed process requires the presence of a complexing agent, such as EDTA, in the aqueous disperson.

The concentrating of polymer solids in an aqueous medium by ultrafiltration has been disclosed in the art in U.S. Pat. No. 3,956,114 and Japanese Kokai No. 18788/1977. The Japanese Patent further discloses that concentrating PVC solids by ultrafiltration requires further processing by spray-drying to obtain the desired separation of the solids from water.

Effecting the separation of suspended solids from a liquid by employing either electrolysis or ultrafiltration alone has not yielded the desired separation. The practical problem is that ultrafiltration cannot remove all the liquid, and electrolysis does not remove all the suspended solids alone. Thus, both processes must be followed by some sort of additional processing, e.g., coagulation, filtrations, spray-drying, extrusion drying, etc.

It is disclosed in U.S. Pat. Nos. 3,663,406 and 3,663,403 and Canadian Pat. No. 968,743 to use electrolysis in conjunction with ultrafiltration along with an additional processing step for electrodepositing coatings onto electrically conductive substrates where the function of the ultrafiltration step is to remove contaminates and generally to maintain stability in the electrodeposition bath. It is not found in the art where electrophoretic techniques are used in conjunction with ultrafiltration to recover suspended solids from a liquid medium.

SUMMARY OF THE INVENTION

In accordance with the invention, it has been discovered that unexpectedly high separation of suspended solids (e.g., approximately 80 percent PVC solids in a wet cake) can be achieved by combining an electrolytic process with ultrafiltration. It has been found, in accordance with the present invention, that the high and constant efficiency of the system is a result of the complimentary actions of electrolysis (E) and the ultrafiltration (UF). The electrolysis removes the suspended solids from the liquid, and the ultrafiltration removes the liquid from the low solids slurry resulting from the electrolysis to increase solids concentration for recycle to the electrolytic step. Without this complementary action, the efficiency of both processes diminishes rapidly, i.e., without liquid removal by ultrafiltration, the liquid containing suspended solids would be gradually depleted making the electrolysis proportionately more inefficient and expensive, and without electrolysis, the efficiency of the ultrafiltration drops exponentially with the increasing concentration of the suspended solids.

Still further in accordance with the invention, a suspended solids recovery apparatus comprising an electrolytic cell alone or in combination with an ultrafiltration unit in a closed loop. The electrolytic cell comprises a container, an anode and a cathode parallel or coaxial thereto with such anode and cathode being electrically connected to a source of direct current external to the cell. This direct current to the cell may be continuous or interrupted. The container has inlet means for introducing the suspended solids-liquid composition. The container also has outlet means, if in combination with an ultrafiltration unit, for circulating depleted liquid through the ultrafiltration unit for removal of a portion of the liquid contained in the depleted suspended solids-liquid composition to raise the suspended solids concentration to optimum for return to the inlet means of the container portion of the electrolytic cell.

Still further in accordance with the invention, the above-described electrolytic cell comprises a container having therein a cylindrical form anode rotating about a horizontal axis, said cylindrical anode being at least partially immersed in the liquid within the container. A coaxial, cylindrical or partially cylindrical cathode member which can be located inside the anode or outside the anode, is completely immersed in the liquid and spaced from the cylindrical anode member. Means for rotating the cylindrical anode are provided as is a scraper of some form, such as a "doctor blade," parallel to the axis of the cylindrical anode member for removing deposited solids from the anode as it rotates.

Still further in accordance with the invention, the anode member as previously described comprises a solid cylindrical tube of sheet metal material, such as titanium sheet, and can have an electrocatalytic coating applied thereto. Still further in accordance with the invention, the cylindrical anode member as previously described is composed of an open mesh-type material and has a covering thereon of a flexible membrane or film which is impermeable to fluids and gases and resistant to degradation under the conditions of deposition.

Still further in accordance with the invention, an ion exchange membrane can be used for (a) simltaneous in-situ neutralization of deposited acidic solids layer, (b) to exchange in-situ, if desired, the cations of the electrolyte in the deposited solids with a different cation, and (c) to protect the anode surface from wear.

According to the present invention, the interior of said cylindrical member contains an ionic neutralizing substance which can pass through the ion exchange membrane to the deposited solids and neutralize its highly acidic condition.

The anode member is a hollow cylindrical member having a continuous surface, or may be formed of a screen or mesh material having openings therethrough to the interior of the cylinder. When open mesh material is utilized, at least that part of the cylindrical member immersed in the latex must be tightly covered with a polymeric material having a surface which will retain the deposited solids. This polymeric material is tightly wrapped around the anode member, or it may be an endless loop passing around one or more pulley members external from the electrolytic cell.

In accordance with the invention, deposition of suspended solids takes place at the anode surface when a direct current is applied to the anode and cathode of the electrolysis cell. As the anode is rotated in the latex, a layer of suspended solids forms on the surface thereof, where the thickness of such solids layer is dependent on the current density and the rotational speed of the anode. The solids layer is scraped from the anode member at a point above the surface of the liquid by a scraper member such as a doctor blade whereupon the solids layer of low water content is collected and passed on for further processing or drying as needed. Gases evolved at the electrodes during the electrolysis, such as when the liquid is water, are preferably vented so as to avoid any possibility of explosion.

As discussed above, if the current efficiency of the above-described electrolysis cell decreases with decreasing solids concentration in the liquid, a portion of the liquid within the electrolysis cell may be constantly withdrawn and passed through an ultrafiltration unit to remove at least a portion of the liquid carrier from the liquid composition. The concentrated liquid composition is then passed back into the electrolytic cell at a higher concentration while the liquid filtrate may be either disposed of or reprocessed for use in some other process such as a polymerization reaction.

Inlet means are also provided in the electrolytic cell for adding new suspended solids-liquid composition to keep the electrolyte level relatively constant while solids are removed electrolytically and where liquid filtrate can be removed by ultrafiltration or other means. The fresh liquid composition may enter into the system by way of either the ultrafiltration unit or the electrolytic cell at a rate to keep the level of the liquid composition in the cell constant, or the liquid composition may be supplied in split streams into both the ultrafiltration unit and electrolytic cell. This process then maintains the liquid composition at a relatively constant level and retains the required volume of liquid within the electrolytic cell for optimum current efficiency.

It will be recognized by those skilled in the art that the process according to the present invention can have application in many areas such as treatment of industrial wastes, e.g., polymer and rubber latex, paper sludge, food, etc., and the recovery of valuable materials, e.g., the concentration of proteins in whey. It will also be recognized that because of the wide applicability of this invention, numerous solid-liquid compositions having widely varying requirements and properties will be treated. This will require variations and modifications to the process and apparatus of the present invention dictated by the particular solids-liquid composition. For example, a composition of high solids content where the solids have relatively large particle size, e.g., paper sludge, would not be ultrafiltered for reason of the obvious pumping problems as well as the problem of clogging the ultrafiltration unit. Thus, such variations and modifications to the present invention are considered to be within the scope of this invention.

These and other aspects of the invention will become clear to those skilled in the art upon the reading and understanding of the specification.

BRIEF DESCRIPTION OF THE DRAWINGS

The invention will be further described in connection with the attached drawing figures showing preferred embodiments of the invention including specific parts and arrangements of parts. It is intended that the drawings included as a part of this specification be illustrative of the preferred embodiment of the invention and should in no way be considered as a limitation on the scope of the invention.

DETAILED DESCRIPTION OF THE PREFERRED EMBODIMENTS

Figure 1:
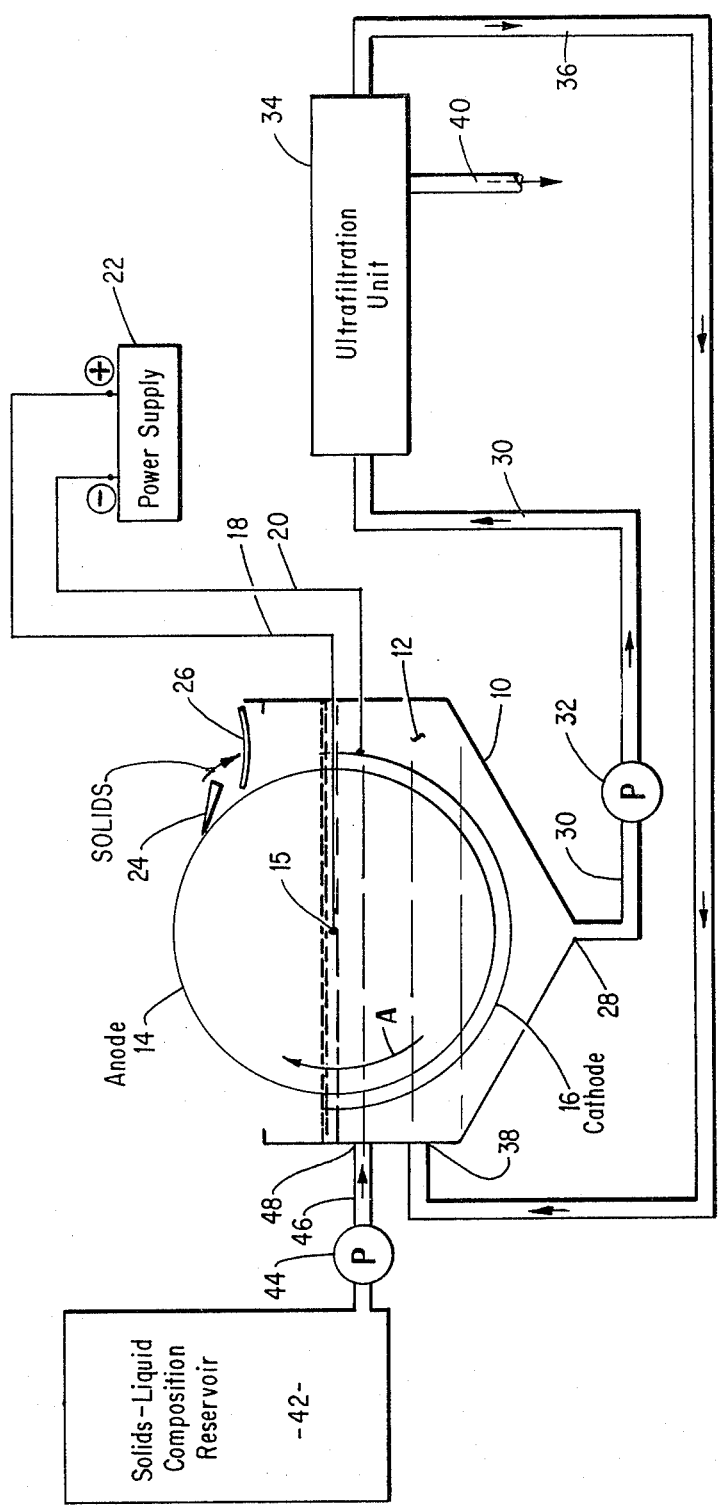
FIG. 1 is a schematic drawing showing the relationships of the various parts of the apparatus used in the present invention.

Referring now to the drawings, FIG. 1 illustrates generally the apparatus used for the electrolytic recovery of suspended solids from a liquid medium comprising an electrolytic cell tank 10 having generally a box or trough form being at least partially filled with a suspended solids-liquid composition 12. A cylindrical-drum form anode 14 having a central axis 15 is disposed horizontally within the trough and at least partially immersed in the solids-liquid composition 12. Means are provided for rotating at a varible speed, the drum anode about horizontal axis 15 in the direction of arrow A. Such means for rotating the drum are not shown but may be of any type such as a V-belt driven pulley system connected to an electric motor. Also disposed within the electrolytic cell tank 10 and completely immersed within the liquid composition 12 is a semi-cylindrical cathode saddle 16 having a common axis with the drum anode 14. Cathode saddle 16 has a diameter which is greater than that of the anode drum 14 (note, however, FIG. 5) so that the cathode saddle 16 is displaced a small distance away from the rotating drum. The cathode 16 is displaced from the anode drum 14 a distance sufficient so as not to shear off the solids layer deposited on the anode. Accordingly, it is desired to deposit a relatively thin layer of solids so that the cathode is as close as possible to the anode. This is accomplished by maximizing the rpm of the anode drum or belt to a speed at which the solids layer is not washed off by the friction of the liquid. The distance of the cathode from the anode while preferably being small is dependent upon several factors such as the speed of the anode contour, the current density, the solids content in the liquid medium, soap content (if a polymer, rubber, etc., composition), and pH vs. desirable or acceptable cell potential.

Rotating drum anode 14 and cathode saddle 16 are electrically connected through conductor wires 18 and 20, respectively, to a source of direct current 22 which may be a rectifier, generator, battery or other such device. When anode drum 14 and cathode saddle 16 are electrically connected through conductors 18 and 20 to power source 22 and current is applied continuously or periodically, a layer of solids is deposited on the surface of drum form anode 14. As drum 14 rotates in the direction of arrow A, the layer of solids reaches scraper member 24 disposed parallel to and directed generally tangentially to the rotating drum and above the level of the suspended solids-liquid composition 12 in the electrolytic cell tank 10. As the solids layer approaches the scraper member 24, it is removed from rotating drum anode 14 and is deposited on means for removing the solids for further processing such as a conveyer belt 26. The cleaned rotating drum anode 14 then continues its rotation back into the suspended solids-liquid composition 12 within the electrolytic cell 10 and presents a clean surface for deposition of additional solids onto such surface.

Drum form anode 14 may be made of any conductive metal such as nickel, iron, or stainless steel but, preferably, is made of valve metal such as titanium or tantalum or alloys thereof with a conductive coating applied thereto. If such metals as nickel or stainless steel or other like are utilized, a small amount of anode dissolution takes place during the electrolytic process and in the case with PVC recovery, results in a contamination of the PVC resin with metal ions such as nickel and/or iron. The presence of these metal ions in the PVC resin may cause heat instability and color differences in the resin. In applications with other solids material where heat stability or color are less important, it would then be possible to utilize these relatively inexpensive anode materials with continuous replacement of the degraded anodes being necessary.

In the preferred embodiment, however, anode drum 14 is made of a valve metal material such as titanium and is coated with an electroconductive coating such as mixtures of precious metals and/or their oxides, oxides of valve metals, oxides of metals such as manganese, tin, antimony or the like or other known electroconductive coatings which are substantially insoluble under the anodic conditions of PVC and like solids deposition in this invention.

In one preferred embodiment of the invention, the drum form anode 14 is constructed of solid metal sheet so that a continuous surface is presented to the liquid composition for deposition, and the suspended solids are deposited directly on the surface of the drum form anode 14.

In another embodiment of the invention, the drum form anode 14 is constructed of an open mesh material such as a wire cloth or expanded mesh material. In this embodiment, a polymer film or membrane material is tightly wound around the drum anode. If the membrane material is a continuous belt, it covers at least the immersed portion of the drum form anode 14. The drum form anode 14 acts only as a current collector while the belt interrupts the deposition of the solids on the surface of the drum form anode 14, and the solids layer is built up on the surface of the membrane rather than on the surface of the drum form anode 14. If the membrane is used as a belt, then the scraper 24 may then be located at any point along the belt to remove the collected resin therefrom. Other embodiments of this invention utilizing the belt will be described hereinafter in conjunction with the other drawing figures.

As the solids layer is deposited on the surface of the drum form anode in one embodiment, the liquid composition 12 becomes less and less concentrated with suspended solids, and as a consequence, the current efficiency of the electrolytic process is reduced. In order to keep the current efficiency at an optimum level, it is desirable to keep the solids concentration in the bulk of the liquid composition 12 in the range of 10 to 60 percent solids and preferably between 35 and 50 percent solids. In order to keep the bulk liquid composition concentration at a desired level, a portion of the liquid composition 12 is drawn off through an orifice 28 disposed at the bottom of the electrolytic cell tank 10 and through conduit 30 by the action of pump 32 to be delivered to the inlet end of an ultrafiltration unit 34. The pump 32 may be of any type but is preferably of the diaphragm or helical type. Centrifugal pumps cause undesirable shear forces to be applied to the liquid composition causing coagulation in some cases, and it is difficult to keep the solids of the liquid medium away from the bearing surfaces which may eventually result in pump failure.

Ultrafiltration unit 34 is of the type well-known to those skilled in the art and consists generally of an ultrafiltration membrane enclosed within a stainless steel or PVC tube. The liquid composition is passed into the ultrafiltration unit 34 where the liquid (e.g., water) and a portion of the dissolved species from the suspended solids-liquid composition are removed through the membrane, the thus concentrated solids-liquid composition passing out of the ultrafiltration unit by conduit 36 and is returned to opening 38 in electrolytic cell tank 10 for further processing. The liquid filtrate from ultrafiltration unit 34 is removed through conduit 40 to a remote point where it may be either reused as a process liquid or disposed of following treatment as needed.

The ultrafiltration unit 34 may be of any suitable type which can effectively remove the liquid from the liquid composition. Generally, in the operation, the liquid composition fed to the ultrafiltration unit 34 contains between about 10 and 40 percent suspended solids particularly in the case of PVC. After the emulsion is passed through the ultrafiltration unit 34, the liquid composition generally contains between about 30 and 55 percent solids. This concentrated liquid composition is fed to the electrolytic cell 10 for removal and recovery of the solids.

The ultrafiltration unit 34 which has been found effective is a unit consisting of a five (5) foot membrane placed in a one (1) inch ID PVC tube. The ultrafiltration units used according to the present invention include membranes of the HFD type manufactured by Abcor, Inc., of Wilmington, Massachusetts. These HFD type ultrafiltration membranes are characterized as having a minimum water flux of 200 gallons per square foot-day (GFD).

If polymer resin, such as PVC, is being removed by the electrolytic process and water is the liquid being drawn through the ultrafiltration unit, it is necessary that the emulsion or latex be replenished from an external source such as a polymerization reactor or a solids-liquid composition reservoir 42 as illustrated in the figures. Pump 44 withdraws the required amount of emulsion from the reservoir 42 and passes the emulsion into the electrolytic cell tank 10 through conduit 46 at opening 48 in the side of the electrolytic cell tank 10.

The rotation of drum form anode 14 will result in some mixing of the solids-liquid composition 12 within electrolytic cell tank 10. However, it may be advantageous to add some type of mixing or agitating means in order to maintain a relatively consistent bath composition throughout. Thus, agitation means such as air agitation or mechanical agitation in the form of a stirring propeller, paddle wheel, pumping, baffle walls or the like may be provided. It will also be understood that, for the purposes of illustration, the size of the tank 10 relative to the size of the drum form anode 14 has been reduced. Generally, a larger volume tank 10 would be utilized so that there would be a more uniform bath composition rather than areas of low concentration as may occur in a small volume bath.

Figure 2:
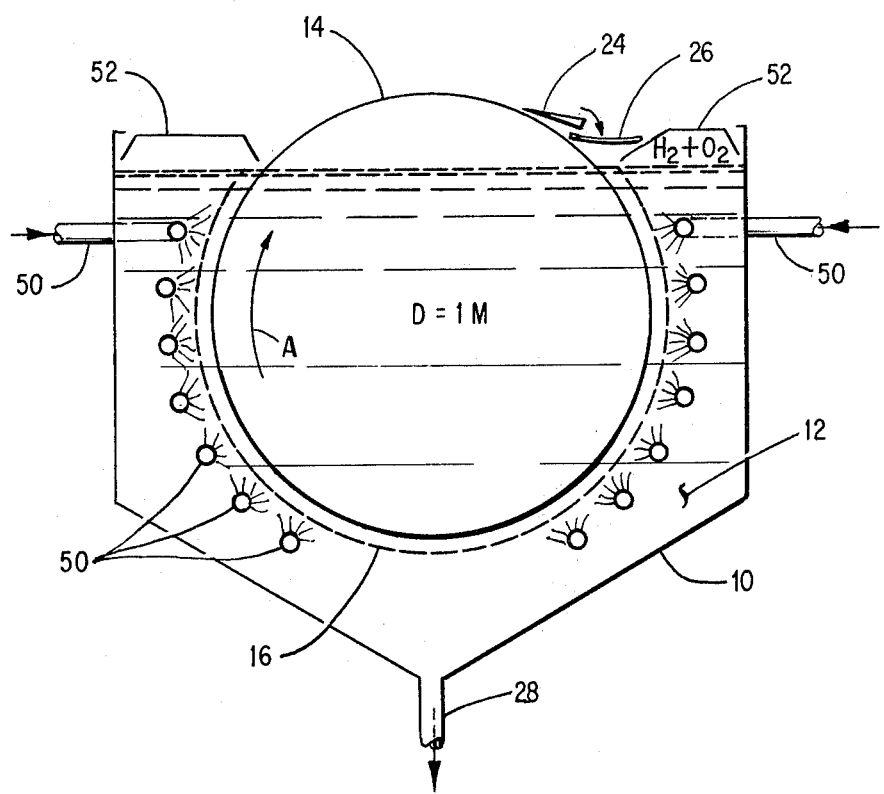
FIG. 2 illustrates one embodiment of the electrolytic cell used in conjunction with the apparatus of FIG. 1 in accordance with the present invention.
Figure 3:
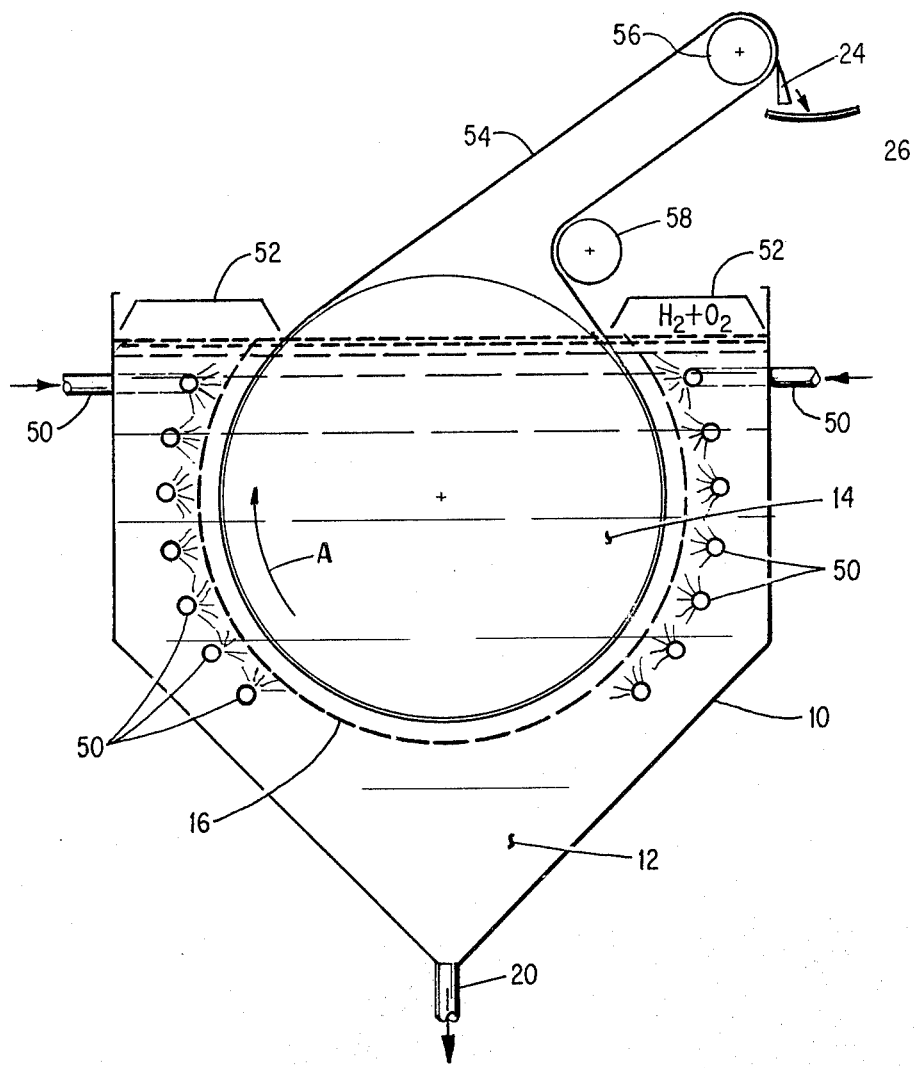
FIG. 3 illustrates a second embodiment of the present electrolytic cell.
Figure 4:
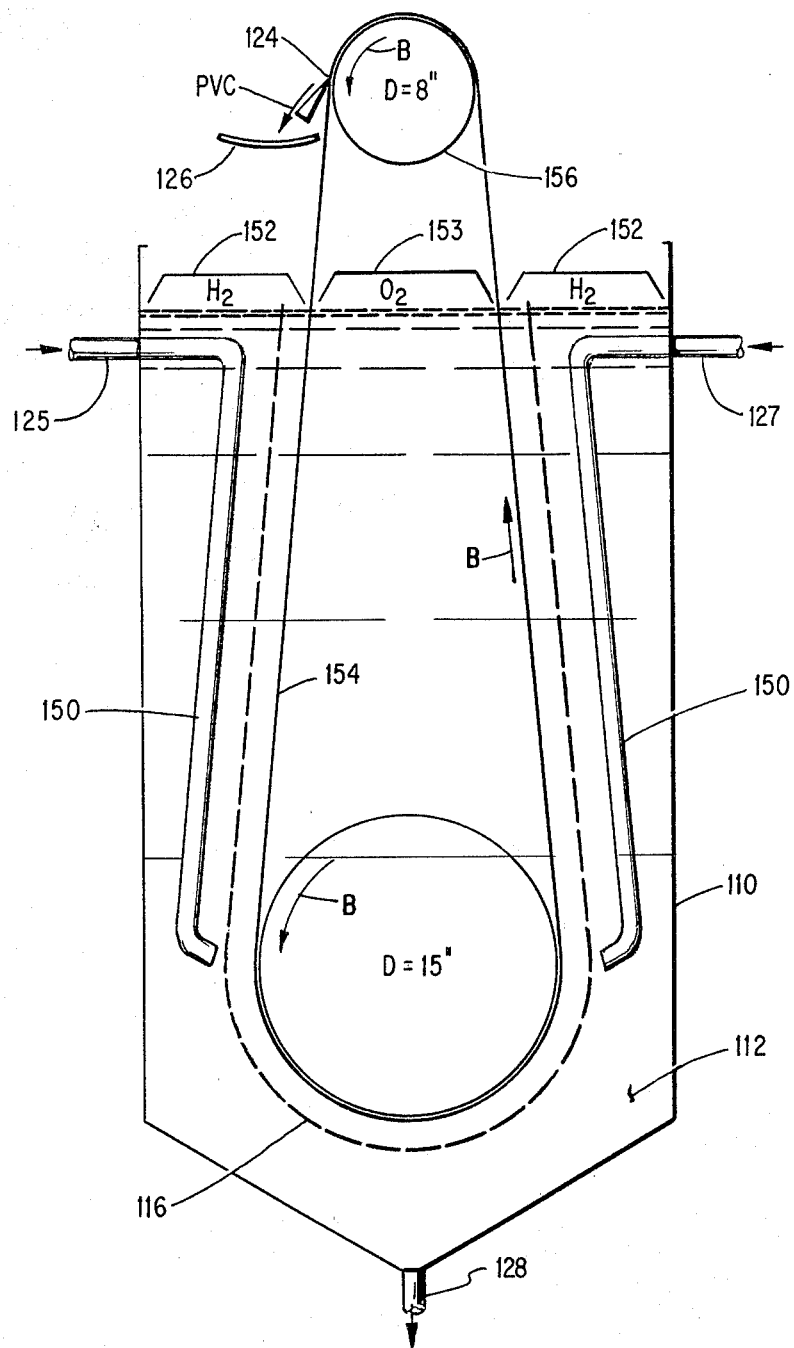
FIG. 4 illustrates a third embodiment of the present electrolytic cell.

It is apparent that the amount of suspended solids deposited from the liquid composition as well as the overall efficiency of the process is directly related to the amount of surface area presented to the solution by the drum form anode 14. In the illustration shown in FIG. 1, the drum form anode 14 is only partially immersed in the deposition bath, and thus presents less than half of its surface area at any one time to the deposition process. FIGS. 2, 3, and 4 illustrate means by which a greater proportion of the drum form anode is immersed in the electrolysis bath thereby presenting a greater proportion of its surface area for deposition of suspended solids thereby increasing the efficiency of the apparatus and the process.

In the embodiment shown in FIG. 2, a drum form anode 14 of the type previously described having a generally cylindrical form is nearly completely immersed in cell tank 10. Concentric cathode saddle 16 surrounds the drum form anode 14 which may have a surface which is of a continuous sheet of conductive material such as a valve metal or alloys thereof and, more particularly a titanium surface upon which any electroconductive coating of the type previously described has been applied. Alternatively, the surface of the drum form anode 14 may be formed from screen material or expanded metal mesh, the surface being covered with an electrically conductive film or membrane material capable of passing at least some ionic species therethrough. This film or membrane may be a cation or anion exchange membrane which may be any of the membranes accepted in the electrochemical arts, such as NAFION, a membrane manufactured by E. I. DuPont De Nemours and Company of Wilmington, Delaware, and described in U.S. Pat. No. 3,909,378.

Generally, the operating resistance of these ionic exchange membranes is distinctly different. That is, the cationic exchange membranes have a lower resistance to electric current than the anionic exchange membranes. Accordingly, in the use of the various membranes (i.e., cationic and anionic) a different potential is required to maintain the same current flow and the corresponding separation rate of solids. Thus, energy-wise, the cationic membrane is more economical.

The cationic exchange membrane has ion exchange groups such as sulfonic, sulfuric and carboxylic groups. Similarly, the anionic exchange membrane has functional groups which contain nitrogen or phosphorous. For example, these functional groups are primary and secondary amines, quaternary ammonium groups, phosphoric groups, phosphonic groups and the like.

In the embodiment shown in FIG. 2, a large amount of the surface area is exposed to the liquid composition bath 12. This arrangement allows for maximum use of the surface for deposition of latex and offers substantial cost savings since a greater proportion of the apparatus is working at any one time.

Also shown in FIG. 2 are a plurality of liquid composition inlets 50. These inlets 50 may take the form of tubular members which are generally parallel to the rotational axis of drum form anode 14. Openings are provided in the side of the tubular members 50 so that a fresh supply of liquid composition either from a reservoir or from the discharge of the ultrafiltration unit or any combination thereof is provided. The plurality of tubular members 50 act to keep the concentration of the liquid composition more consistent throughout the bath and also provide a source for agitation for the bath.

The deposition process when working with an aqueous medium involves the evolution of hydrogen at the cathode 16 and oxygen at the anode 14. These gases bubble to the surface of bath 12 and may be collected by hoods 52 placed over the surface of the bath and adjacent to the rotating drum form anode 14. These gases are then removed and either exhausted or processed as necessary. The evolution of gases also performs some agitation of the bath. An alternative embodiment of the invention is shown in FIG. 3 wherein a belt of flexible material preferably an ion exchange membrane belt 54 passes around rotating drum form anode 14 and around a remote pulley 56 disposed away from cell 10. This allows the removal of the deposited solids by scraper 24 at a point remote from the cell thereby avoiding the problems of scraped solids material falling back into the liquid composition within the cell. The belt returns to the area of the drum form anode passing around pulley member 58 prior to tangentially wrapping around drum form anode 14 to again pass through the bath. The remainder of the cell is substantially identical to that shown in FIG. 2 and need not be further described.

As stated previously, the rotating drum form anode offers only a limited amount of surface area to be exposed to the deposition process thereby limiting the efficiency of the system for a given size of bath. FIG. 4 illustrates an embodiment of the invention which offers greatly increased surface area without an extreme increase in the size of the apparatus employed. As shown in the figures, the cell comprises a relatively deep tank 110 which is filled with solids-liquid composition 112. Immersed within the tank 110 is a cylindrical drum form pulley 114 completely immersed therein. A second pulley 156 is located above the liquid composition level outside the bath. A belt of conductive material such as metal mesh 154 is made nonconductive on the inside but conductive on the outside by an electroconductive coating, passes around both pulleys 114, 156 and a drive means, not shown in the figures, turns the belt 154 and pulley system 114, 156 in the direction of arrow B. Belt 154 is preferably made of a flexible metal (e.g., stainless steel) having an electroconductive coating applied thereto. Optionally, this coated titanium mesh material may have an ion exchange membrane applied thereto from which the resin is more easily removed.

A saddle of cathode material such as stainless steel mesh 116 follows the contour of belt 154 within the liquid composition. A plurality of liquid composition inlets 150 are disposed within the tank 110 to distribute the incoming latex evenly throughout the system. Depleted liquid composition is drawn out as in the other cells through opening 128 located in the bottom of the tank 110 and passed through an ultrafiltration unit as in the previously described processes.

Optionally, if the inside of the moving belt anode is made conductive, means are provided to control the deposition and removal of the solids from that side of the anode.

Preferably, the moving belt anode which is conductive only on its outside is embedded in an ion exchange resin continuous film and has one or more traveling insulated wire contacts for the DC feed. The wires are joined at one at a point 157 of equal distance from the bottom of pulley 114 and the top of pulley 156. The one wire leaves the cell through a conduit above the liquid composition level and ends in a sliding contact which allows a rotation of this contact on another contact of a DC source. The pulleys are made preferably of a dielectric, corrosion-resistant material such as PVC and the like.

When an electrical potential is applied to the cathode 116 and the anodic belt 154, a solids layer is deposited on the portions of the belt which are immersed in the liquid compositon 112. Since the solids layer is only moderately adherent to the anode surface, it is preferred that the diameter of pulley 156 be significantly smaller than that of pulley 114. This allows the convergence of the belts as it rises vertically in the solution. This offers the advantage of having at least some of the forces tending to separate the solids from the anode surface to be overcome by gravitation which holds the solids against the belt. As the belt passes around pulley 156, a scraper member 124 removes the resin from the belt, and the material is then removed from the area of the cell by a conveyor belt 126.

Figure 5:
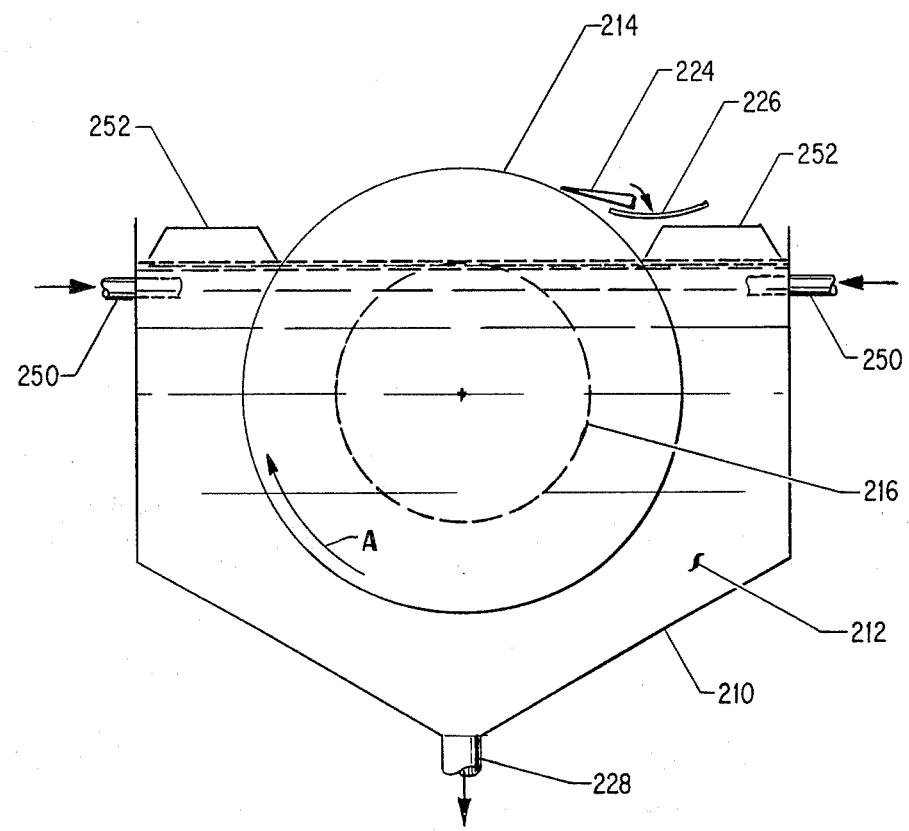
FIG. 5 illustrates a fourth embodiment of the present electrolytic cell.

FIG. 5 illustrates another embodiment of the invention. In this embodiment, the cathode member 216 is located interior to drum form anode 214. The cathode 216 can be in the shape of a drum or the saddle form of the previously described embodiments, as long as it is completely immersed in the liquid composition 212. The cathode member 216 can be stationary or rotate in the liquid composition bath 212 as long as the cathode 216 is insulated from the means for rotating drum form anode 214 (not shown). The remainder of the cell is substantially identical to that shown in FIG. 2 and need not be further described.

It is readily apparent that other features of the other illustrated embodiments of the invention are applicable to the embodiment illustrated by FIG. 5. In this embodiment, however, the surface of the drum form anode 214 must be formed from sheet material or expanded metal mesh, the surface being covered with a polymer film or membrane material capable of passing ionic species therethrough. The film or membrane may be a cation or anion exchange membrane, as previously described, depending upon the solids material being deposited thereon as well as other considerations.

This embodiment offers the advantage of the cations in the liquid composition 212 migrating in only a single direction, namely: toward the cathode interior to the anode. This feature is of benefit when it is desirable to remove a particular cation or cations from the solids material such as in the case of de-watering paper sludge. The sodium ions present in paper sludge appear to cause the sludge to repeptize everytime it rains. Thus, the sludge never completely de-waters and the result is a "quick-sand" like landfill. Therefore, in using this embodiment to de-water paper sludge, the sodium ions "dragged" to the anode surface will pass on through the membrane to the cathode and can be removed from the electrolytic cell tank 210 under reduced pressure or by other means such as pumping.

One of ordinary skill in the art will recognize that the specific embodiment and operating conditions employed will be dependent upon the particular solids-liquid composition being processed. As described previously, the embodiments of FIG. 5 would be particularly useful for the de-watering of paper sludge. Untreated paper sludge does not require the addition of surfactants nor is it necessary to neutralize the paper sludge solids being deposited on the anode. However, with PVC resin which can be produced in a water emulsion from vinyl chloride monomer, a surfactant is generally employed to keep the PVC resin dispersed in the emulsion. Such surfactants are generally referred to as "soaps," and they generally comprise sulfuric acid salts of a long chain fatty acid such as sodium lauryl sulfate. It has been found that in the depositon of PVC resin, it is necessary that at least some soap be present in the emulsion for deposition to take place. This has lead to the inference that the organosulfate anion is the migrating species in the applied electromagnetic field and that the associated polymer particles are carried along with this ionic species to the anode. This inference is further supported by the fact that the pH of the bulk latex increases while the pH of the deposited material tends to be acidic in nature. Other mechanisms may be possible, however, since some nonionic surfactants affect electrolytic deposition while cationic surfactants generally cause little deposition on either an anode or cathode.

In the recovery of PVC solids from an emulsion or latex, the latex deposited on the anode is relatively acidic when compared to the remainder of the bath due to the presence of the acidic group associated with the surfactant used in the process. It is possible within the scope of the present invention to neutralize this acidic condition by the provision of a neutralizing substance such as sodium or potassium hydroxide located within a drum form anode having an open mesh structure and an ion exchange membrane covering its surface. Thus, during the electrolysis process, a neutralizing ionic species such as potassium ions or sodium ions will pass through the membrane toward the cathode and into the deposited resin material there to neutralize the acidic species within the resin. This technique only requires that an inlet to the interior of the drum form anode 14 be provided and that a source of neutralizing substance be supplied to such inlet at an adequate rate. In this situation, it is evident that the embodiments of FIGS. 2, 3 and 4 would be preferred.

Still further in accordance with the invention, the process of the present invention is suitable for the separation of PVC and/or PVC copolymers from latices of various compositions having a polymer content of from about 5 to 60 percent and from 0.3 to 5.0 percent of an anionic or nonionic surfactant (based on the polymer content). The polymer content is preferably between 35 and 45 percent, and the surfactant content is preferably between 0.5 and 1.0 percent. The pH can vary from 0 to 14, preferably from 3 to 12, and the temperature from 0° to 90° C. or preferably from 20° to 40° C. The electrolysis can be carried out at constant DC current at a current density (CD) varying from 1 mA to 300 mA per $cm^2$ electrode surface area, in which case the cell voltage may vary from 1 to 50 volts, or the electrolysis can be carried out at constant cell voltage and variable current. The DC current can be applied continuously or periodically. Since the rate of the electrolytic polymer deposition is proportional with the current density (CD) and the concentrations of polymer in the latex, the maintenance of the sufficiently high polymer concentration is necessary for an efficient operation of the process. This also being true for other solids-liquid compositions. While a constant current density (CD) can be set easily at any value on the power source, the maintenance of the polymer concentration is not possible without removing water from the latex. It has been found that equilibrium conditions between the electrolysis unit and ultrafiltration unit can be established in such a way that the ultrafiltration unit is able to remove the right quantity of water and maintain a constant and sufficiently high polymer concentration for an efficient and steady rate of electrolysis.

In addition, it has been found to be advantageous to apply to the anode surface of the electrolytic cell certain metal oxide coatings such as manganese dioxide, ruthenium dioxide and tantalum dioxide or their combination. These current conductive oxides minimize surface corrosion and contamination of the solids material, particularly PVC, with metal particles. An electrode treated in a similar manner is disclosed in U.S. Pat. No. 3,878,083. According to the present invention, ion exchange membranes can be used advantageously in the process of the present invention to accomplish several desirable effects. For example, by covering a mesh anode with a cation exchange membrane, it is possible to simultaneously neutralize the deposited acidic solids in-situ, thus eliminating a separate post-neutralization process and the necessary equipment and labor. The same membrane can also be used for the in-situ exchange of cations of the surfactant in the deposited solids material. This type of a cation exchange is often desirable in order to improve the properties of such materials as PVC plastisols. The membranes on the anode protect the electrode surface from wear and damage also. These membranes can also be used as moving belts for carrying the deposited solids on them away from the cell for a more convenient removal.

Further in accordance with the present invention, whey can be concentrated by the present electrolytic-ultrafiltration process. A wide variety of processes have been devised to achieve desirable concentration and separation of whey proteins including electrolytic techniques as illustrated by U.S. Pat. No. 4,146,455. Any one of the embodiments of the present invention previously described can be used in processing and concentrating whey. It may be necessary, however, to initially add sufficient acid or base to destroy the apparent electrical neutrality of the whey composition so as to obtain a much greater deposition of whey solids on the anode. The advantages of the present process for concentrating whey protein, over the process methods of the prior art presently being used, is that the present process does not require a need for extensive evaporating equipment, and also there is not the need to subject the whey to excess heat which can result in denaturation.

As previously mentioned, the present invention has been found useful to dewater paper sludge. Presently the paper industry filters and dumps its sludge into a landfill. When it rains, the sludge repeptizes, forming a "quicksand"-like pond which also ferments and bubbles in the summer releasing pungent odors. Thus, an obvious environmental problem results, where the land cannot be reused since, in this state, the pond cannot be covered with dirt and planted over with grass. It would, thus, be desirable to reduce the repeptization of the dumped sludge when it rains.

It has been found, in accordance with the present invention, that paper sludge can be dewatered by employing the electrolytic cell of the present invention, alone without ultrafiltration, and by pulling a vacuum in the cell, the sludge is deposited on the anode and the sodium ions present are removed at the cathode. It should be recognized that removal of ions, particularly sodium ions, present as well as the actual dewatering of the sludge is important to reducing the peptization action that occurs when it rains. As previously pointed out, the composition of the paper sludge does not readily lend itself to ultrafiltration, however, any of the electrolytic cells disclosed herein could be employed for the purposes of this special use where the cell of FIG. 5 is preferred. Also, most permeable membranes or films, previously mentioned, can be used as the belt covering the anode, however, a filter cloth is preferred.

Thus, from the previous discussion, the apparatus and process of the present invention, as further illustrated in the examples below, is found to be advantageous over the prior art methods. The electrolytic-ultrafiltration system works under widely variable conditions and allows a great engineering flexibility without impairing the high efficiency. The following examples will serve to further illustrate the operation and advantages of the invention. These examples should not be considered, however, as a limitation upon the scope of the present invention where such scope is defined only by the claims.

EXAMPLE 1

PVC RECOVERY AT CONSTANT ELECTRIC CURRENT WITHOUT ULTRAFILTRATION (UF)

This example is outside of the scope of the present invention and illustrates that the electrolytic process for PVC separation, as described in prior art processes (e.g., process of British Pat. No. 1,525,103) loses its efficiency proportionally with the decrease of PVC content in the latex during the separation. In an experiment, using a prior art process, electrolytic removal of PVC was performed at a constant electric current, weighed, dried and weighed again. Table 1, below, shows the reduction in PVC recovery in time as more and more PVC is removed and the increase of electrical energy for obtaining the same quantity of PVC.

TABLE 1

PVC Recovery at Constant Electric Current Without Ultrafiltration (UF)

| Time (minutes): | 10 | 20 | 30 | 40 | 50 | 60 | 70 | 80 | 90 | 100 |
|---|---|---|---|---|---|---|---|---|---|---|
| Approx. % PVC in latex: | 37 | 34 | 31 | 29 | 27 | 25 | 23 | 22 | 21 | 20 |
| PVC recovered (grams): | 168 | 155 | — | 127 | 118 | 105 | — | 88 | 71 | — |
| Needed amp. hr/kg/PVC: | 0.53 | 0.57 | — | 0.70 | 0.76 | 0.85 | — | 1.0 | 1.26 | — |

As shown by the results of Table 1, the removal of PVC from a latex with a low PVC content (i.e., 1 to 5 percent) is uneconomical in the practice of prior art processes. Since some latices can be neither filtered, nor centrifuged and the cost of spray drying is prohibitive, the disposal of such dilute latex is, therefore, a liability on the prior art process.

EXAMPLE 2

PVC RECOVERY AT CONSTANT ELECTRIC CURRENT WITH ULTRAFILTRATION (UF)

In contrast to Example 1, the following Examples A and B given here are within the scope of the present invention and they illustrate the decisive advantage of combining an unrelated process, namely ultrafiltration (UF) with the electrolytic (E) process. By utilizing ultrafiltration (UF), it is possible to remove water from the electrolytically depleted latex at a rate which corresponds to the quantity of removed PVC. By this combined process, the PVC concentration can be maintained at any desired concentration and have an efficient, constant rate of recovery of PVC. The results of the (E-UF) PVC recovery of Experiments A and B are provided below in Table 2. As indicated by the results, the recovery (i.e., removal) of PVC is at a generally constant rate. The results in Table 2 show the amount of PVC recovered for each ten (10) minutes of operation at a constant electric current. For Experiment A, the PVC content was kept between 35 percent and 38 percent and for Experiment B, between 25 percent and 29 percent for a duration of two hours, each. The variance in PVC recovery between the experiments A and B is due to other differing conditions such as pH, type or quantity of surfactant.

TABLE 2

PVC Recovery at Constant Electric Current With Ultrafiltration (UF)

| | PVC Recovered (grams) | |
|---|---|---|
| Ten-Minute Intervals | Experiment A | Experiment B |
| 1 | 95 | 128 |
| 2 | 96 | 128 |
| 3 | 99 | 134 |
| 4 | 95 | 135 |
| 5 | 95 | 133 |
| 6 | 86 | 149 |
| 7 | 94 | 143 |
| 8 | 92 | 135 |
| 9 | 91 | 138 |
| 10 | 88 | 146 |
| 11 | 88 | 156 |
| 12 | 89 | 148 |

EXAMPLE 3

EFFICACY OF ELECTROLYTIC-ULTRAFILTRATION (E-UF) PROCESS FOR RECOVERY OF PVC

The efficacy of the utilization of the present combined electrolytic-ultrafiltration (E-UF) process for a continuous and practical PVC recovery from latices was further illustrated by three experiments, i.e., C, D and E. The results of the experiments are provided, below, in Table 3. As indicated by the results, the maintenance of the PVC concentration by the E-UF system shows that the combined process is economically viable and superior to the prior art processes of Example 1.

In these experiments, the apparatus used is illustrated by FIG. 1 and the anode of the electrolytic cell is a bare TIR-2000* coated Titanium (Ti) drum. The latex used in the three experiments was taken from three (3) different suitable sources.

*TIR-2000 is an anode of an electroconductive base of titanium with a coating of tantalum oxide and iridium oxide as described in U.S. Pat. No. 3,878,083.

TABLE 3

Efficacy of Electrolytic-Ultrafiltration (E-UF) Process for Recovery of PVC

| Experiment | C | D | E |
|---|---|---|---|
| PVC concentration (%) of latex | 38 | 29 | 36.9 |
| Surfactant content (%) | 2.21 | 1.2 | 1.0 |
| Surfactant type | TDS* | NH$_4$—LS** | SLS*** |

TABLE 3-continued

Efficacy of Electrolytic-Ultrafiltration (E-UF) Process for Recovery of PVC

| Experiment | C | D | E |
|---|---|---|---|
| Electrolysis | | | |
| Time of experiment (hrs) | 7.0 | 2.5 | 4.0 |
| Cell V | 11.3–8.2 | 12.4–10.3 | 16.6–16.3 |
| Current density: mA/sq in | 120 | 120 | 120 |
| Temperature, °C. | 23–27 | 22–32 | 22–28 |
| pH | 5.8–11.4 | 9.0–9.08 | 10.4–11.5 |
| Latex supply (automated), ml | 8200 | 5430 | 8500 |
| (approx.), g | 9300 | 6000 | 9700 |
| PVC separated (wet cake), g | 4710 | 2742 | 4684 |
| PVC separated (wet cake), lb | 10.4 | 6.05 | 10.3 |
| PVC content (%) | 82 | 78.5 | 77.42 |
| PVC separated dry, g | 3860 | 2152 | 3626 |
| Used electricity, kwh | 0.129 | 0.059 | 0.131 |
| Efficiency, lb/kwh | 66 | 80.0 | 61.0 |
| Efficiency, lb/amp-hr | 0.61 | 1.1 | 1.0 |
| PVC g/hr-sq. in. anode area | 31 | 47.8 | 51 |
| PVC conc. in Latex at end (%) | 35 | 24.5 | 36.5 |
| Ultrafiltration | | | |
| Tube inlet, psi | ~5 | 9.5 | 5.0 |
| Flow rate, ft/sec (calculated) | ~6.5 | | 6.5 |
| Permeation rate, ml/min | Avg. 26 | 142–100 | 23.2 (avg.) |
| Permeate removed, ml | 5275 | 4100 | 5575 |
| pH | 10.4–11.4 | 9.5–9.3 | 10.6–11.2 |
| Surfactant content (%) | 0.55 | 0.07–0.1 | 0.22 |

*TDS-Sodium tridecyl sulfate
**NH$_4$-LS-Ammonium lauryl sulfate
***SLS-Sodium lauryl sulfate As shown by the above results, these experiments, particularly Experiment C, demonstrate the feasibility of maintaining the PVC concentration in the cell latex by ultrafiltration, and sustaining a steady, efficient PVC separation by this combined E-UF process.

EXAMPLE 4

EFFICACY OF SURFACTANTS

This example illustrates the effect of different surfactants on the electrolytic separation of PVC from latices. There is no, or little, separation of PVC without having ionic surfactants in the latex. A latex without a surfactant is not conductive to electric current, thus the process is ineffective. This example comprises a series of experiments in which 6 anionic, 5 nonionic and 2 cationic surfactants were tested. It is a fact that the conductivity of the latex as an essential condition for electrolytic PVC separation is due to an ionic surfactant (or soap). It, therefore, was unexpected to discover that certain nonionic surfactants not only were also effective, but were even more effective in aiding the efficiency of the process than the customary anionic surfactants.

The procedure for the experiments and the list of tested surfactants are provided below and their effect on the efficiency of electrolytic PVC recovery is also provided below in Table 4.

The PVC used for this study was recovered by the E-UF process from a commercial latex and the surfactant removed by extraction (residual surfactant 0.21 percent). This extracted PVC could neither be suspended in water nor electroplated without resupplying some of the surfactants tested. The experimental procedure was as follows:

1. The surfactant, corresponding to 0.5 g 100 percent concentration (or one percent based on PVC) was dissolved in 150 ml deionized water, stirred until dissolved (i.e., 5 to 15 min.), and the pH determined;
2. then, 50 g of PVC was gradually added to the soap solution while being stirred gently to avoid foaming, and after complete suspension;
3. the suspension was sonified for 10 minutes and the pH determined;
4. the obtained latex was moderately stirred while electrolyzed at a constant 0.4 amp. The total immersed surface area of the TIR-2000 coated Ti plate anode was 40 cm$^2$. The cathodes of Ti mesh were 12 mm from the anode, on both sides, parallel with the anode;
5. the electrolysis was maintained for 4 minutes at the same current density and the initial, half-time, and final cell potentials recorded; and
6. finally, the deposited PVC was scraped off the anode, weighed, dried, and weighed again.

The surfactants used in the experiment were:

| | | List of Surfactants | |
|---|---|---|---|
| No. | Trade Name | Generic Name | Type |
| 1 | SLS | Sodium lauryl sulfate | anionic |
| 2 | MgLS | Magnesium lauryl sulfate | anionic |
| 3 | NH$_4$LS | Ammonium lauryl sulfate | anionic |
| 4 | TDS | Sodium tridecyl sulfate | anionic |
| 5 | Aerosol OT-25 | Sodium dioctylsulfosuccinate | anionic |
| 6 | Igepon T-77 | Sodium-N-methyl-N-oleyltaurate | anionic |
| 7 | Brij-30 | Polyoxyethylene(4)lauryl ether | nonionic |
| 8 | Tergitol 15-5-9 | Polyethyleneglycol ether of linear C$_{11-5}$ alcohols | nonionic |
| 9 | Igepal CO 30 | Nonylphenoxypolyethyleneoxyethanol | nonionic |
| 10 | Triton X-100 | Octylphenoxypolyethoxyethanol | nonionic |
| 11 | Hyonic | Alkylphenoxy polyoxyethylene ethanol | nonionic |
| 12 | Ethoduomeen T-25 | N, N'-polyoxyethylene-(15)-N-tallow-1,3 diaminopropane | cationic |
| 13 | Emicol CC-9 | Polypropoxylated quaternary-ammonium chloride | cationic |

The results of the runs are provided below in Table 4.

TABLE 4

Effect of Different Surfactants on Electrolytic Recovery of PVC

| | | | Obtained PVC | | Avg. |
| No. | Surfactant | Type | Grams | lb/amp-hr | lb/kwh* | Cell V* |
|---|---|---|---|---|---|---|
| 1 | SLS | − | 10.7 | 0.885 | 59.0 | 15 |
| 2 | MgLS | − | 6.5 | 0.538 | 28.1 | 19 |
| 3 | NH$_4$LS | − | 10.6 | 0.877 | 63.2 | 14 |
| 4 | TDS | − | 10.3 | 0.852 | 61.4 | 14 |
| 5 | Aerosol OT-25 | − | 15.6 | 1.291 | 71.7 | 18 |
| 6 | Igepon T-77 | − | 5.5 | 0.455 | 50.6 | 9 |
| 7 | Brij-30 | 0 | 18.6 | 1.540 | 51.3 | 30 |
| 8 | Tergitol 15-5-9 | 0 | 13.5 | 1.120 | 33.1 | 34 |
| 9 | Igepal CO 30 | 0 | 19.1 | 1.582 | 47.0 | 33.6 |
| 10 | Triton X-100 | 0 | 17.1 | 1.475 | 46.8 | 31.5 |
| 11 | Hyonic | 0 | 16.8 | 1.336 | 53.4 | 26.0 |
| 12 | Ethoduomeen T-25 | + | none | | | |
| 13 | Emicol CC-9 | + | Did not disperse PVC in H$_2$O. | | | |

Type: − anionic; 0 nonionic; + cationic
*approximate values

From the results recorded in Table 4 above, it is evident that:

1. Among the 6 anionic alkyl sulfate surfactants, those having a two-valent cation such as Mg, or having a nitrogen in the molecule cut the current efficiency to about half of those having the monovalent sodium;
2. the tested nonionic surfactants provided to be more effective than most of the anionics as to the PVC deposit on the anode; and
3. the cationic surfactants caused no deposition of PVC on the cathode and neither on the anode.

EXAMPLE 5

CURRENT EFFICIENCY FOR PVC DEPOSITION VS. SURFACTANT CONTENT

The following experiments, i.e., F through N, were carried out to establish the influence of the quantity of the surfactant in an electrolysis type of PVC deposition process in which the electrodes were in direct contact with latex.

In these experiments, the original surfactant was first removed by extraction from over 4 pounds of electrolytically separated, dried and milled PVC. In 200 ml volumes deionized water, 100 g quantities of this PVC were suspended. Before suspension, predetermined quantities of surfactant (i.e., sodium lauryl sulfate) ranging from less than 0.2 percent to 2 percent were dissolved in the waters. The batches (each 300 g) were magnetically stirred, then treated with ultrasonics for 10 minutes and immediately electrolyzed for 5 minutes at 0.5 amp. constant current. The current density was 10 mA/cm$^2$. The anode was a TIR-2000-coated Ti plate with 50 cm$^2$ of its surface immersed in the stirred latex. The initial and final pH of the batches and the temperatures were also measured. The "plated" PVC was removed from the anode, weighed, dried and weighed again. The dry weights of separated PVC and the initial pH of the latex batches vs. the surfactant content in the latex are recorded below in Table 5.

TABLE 5

| | Dry Weight of Separated PVC and pH of Latex as Based on Surfactant Content | | |
|---|---|---|---|
| Experiment | Surfactant Content (%) | Dry Weight of PVC (grams) per amp. hour | pH of Latex |
| F | 0.20 | none | 7.1 |
| G | 0.25 | 629 | 8.2 |
| H | 0.50 | 843 | 8.1 |
| I | 0.75 | 829 | 8.9 |
| J | 1.00 | 637 | 9.1 |

TABLE 5-continued

| | Dry Weight of Separated PVC and pH of Latex as Based on Surfactant Content | | |
|---|---|---|---|
| Experiment | Surfactant Content (%) | Dry Weight of PVC (grams) per amp. hour | pH of Latex |
| K | 1.25 | 605 | 9.2 |
| L | 1.50 | 548 | 9.5 |
| M | 1.65 | 428 | 9.3 |
| N | 2.00 | 449 | 9.5 |

The data provided above in Table 5 shows that the current efficiency as a function of quantity of surfactant goes through a maximum. While this is a general characteristic of the efficiency-surfactant quantity relation, the location of the maximum and its magnitude also depends on the type of surfactant present in the latex.

EXAMPLE 6

ION-EXCHANGE MEMBRANES IN ELECTROLYTIC SEPARATION OF PVC

The application of different ion-exchange membranes in the electrolytic PVC separation has been illustrated in the following experiments, i.e., Experiments P, Q, R, S, T, U, V and W.

A TIR-2000* coated mesh drum electrode was constructed with interchangeable membranes. These experiments were carried out under the same conditions with particular emphasis on the effect of various membranes (MB) on the rate of PVC deposition. Three anion and two cation exchange membranes (MB) were tested. The membranes (MB) covered the drum electrode which was charged with 250 ml distilled water or dilute sodium hydroxide solution to solubilize the surfactant if it crossed the membrane or quenched the generated hydrogen ion, respectively.

At the end of the experiment, the solution from the drum electrode was recovered and analyzed. The PVC concentration in the circulated latex was maintained by simultaneous ultrafiltration.

The electrolysis time was one hour for each experiment, except one (i.e., Experiment U) for one-half hour, at a constant one ampere or about 60 mA/in.sq. current density (CD).

Table 6 lists the tested membranes and records the experimental results, compared with a control experiment without a membrane (i.e., Experiment P).

TABLE 6

| | Efficiency of E-UF Separation of PVC Using Various Membranes | | | | | | |
|---|---|---|---|---|---|---|---|
| | | | | PVC, g | | Final pH of Solution | |
| Experiment | Membrane | A** | V*** | Wet | Dry | In Anode | UF Permeate |
| P | None, bare anode | 1 | 10.6 | 993 | 732 | — | 11.3 |
| Q | MB-1 anion exchange (H$_2$O inside) | 1 | 19.0 | 729 | 556 | 2.2 | 11.5 |
| R | MB-2 cation exchange (H$_2$O inside) | 1 | 9.2 | 851 | 625 | 3.1 | 11.5 |
| S | MB-3 anion exchange | 1 | 14.6 | 876 | 655 | 1.8 | 11.0 |
| T | MB-4 cation exchange (H$_2$O inside) | 1 | 9.5 | 764 | 696 | 2.6 | 11.3 |
| U | MB-5 anion exchange (H$_2$O inside) | 1 | 40.0 | 266 | 191 | 2.7 | 10.8 |
| V | MB-3 anion exchange (0.166N NaOH inside) | 1 | 15.0 | 797 | 567 | 12.7 | 11.3 |
| W | MB-4 cation exchange | 1 | 9.7 | 766 | 592 | 12.1 | 11.5 |

TABLE 6-continued
Efficiency of E-UF Separation of PVC Using Various Membranes

| Experiment | Membrane | A** | V*** | PVC, g Wet | PVC, g Dry | Final pH of Solution In Anode | Final pH of Solution UF Permeate |
|---|---|---|---|---|---|---|---|
| | (0.166N NaOH inside) | | | | | | |

*TIR-2000 is an anode of an electroconductive base of titanium with a coating of tantalum oxide and iridium oxide as described in U.S. Pat. No. 3,878,083.
**amperes
***operating voltage As shown by the last two experiments (i.e., Experiments V and W) above, unless a base (e.g., NaOH) is used for neutralization, an acidic environment is produced in the vicinity of the anode which makes the deposited PVC acidic also.

EXAMPLE 7
SIMULTANEOUS NEUTRALIZATION OF ELECTROLYTICALLY DEPOSITED PVC

The usefulness of ion exchange membranes for the simultaneous neutralization of electrolytically deposited PVC has been demonstrated in the experimental series of Example 6.

The electrodeposition of the PVC from a latex with a surfactant, for example, sodium lauryl sulfate $CH_3-(CH_2)_{11}-SO_4^-Na^+$ results in an acidic PVC of a pH of ~2–3 deposited on the anode due to the $CH_3(CH_2)_{11}SO_4^-H^+$ formation on the PVC, while sodium hydroxide forms at the cathode. The thermal stability of this acidic PVC is inadequate, therefore, such PVC must be neutralized in a separate operation with a base. The replacement of the acidic hydrogen with another sodium, ammonium or alkali metal ion became possible by depositing the PVC onto a membrane which has a basic solution on the opposite side of the membrane. A hydroxide concentration gradient of 0.05–0.2 equivalent higher over the bulk electrolyte was sufficient to maintain a simultaneous neutralization of the PVC deposit. The electrolysis was carried out at two amperes constant current.

Table 7, below, shows 4 in-situ neutralization experiments (i.e., Experiments AA, BB, CC and DD) using a NAFION ® cation exchange membrane described in U.S. Pat. No. 3,909,378 over a perforated drum anode into which a predetermined volume of base having experimentally determined concentration was metered during the electrolytic deposition of PVC. The cations of the base transfused from inside of the drum anode through the membrane into the PVC layer and replaced the acidic hydrogen of the alkyl hydrogen sulfate, thus neutralizing the half sulfuric acid surfactant forming a salt, the same or similar to the original surfactant. The pH's of the simultaneously neutralized PVC are compared with the pH of an unneutralized PVC in Experiment EE.

The practical benefit from this in-situ simultaneous neutralization is that it eliminated the extra expenses for space, neutralizing equipment, power and labor, which are required for a post-neutralization of the acidic PVC.

TABLE 7
Simultaneous Neutralization of Electrolytically Deposited PVC

| Experiment | AA | BB | CC | DD | EE |
|---|---|---|---|---|---|
| Experiment using | KOH | LIOH | NH₄OH | NaOH | None |
| Cell voltage | 17.5 | 14.0 | 21.5 | 14.5 | 10.5 |
| Electrolysis time (min.) | 90 | 90 | 90 | 95 | 90 |
| Separated PVC (g) dried | 951 | 780 | 1430 | 950** | 1210 |
| SLS surfactant (meq)* | 17.5 | 14.3 | 26.3 | 31.5 | 31.0 |
| MgLS surfactant (meq) | 7.2 | 5.9 | 10.8 | — | — |
| Total surfactant in latex (meq) | 24.7 | 20.2 | 37.1 | 31.5 | 31.0 |
| Total base metered into anode (meq) | 79.0 | 80 | 184 | 87 | none |
| Recovered from drum | 22.0 | 6 | 53 | 97 | none |
| Net base used (meq) | 57.0 | 74 | 131 | 77.3 | none |
| (meq) of surfactant equivalent | 230 | 366 | 353 | 245 | none |
| Avg. pH of deposited PVC | 5.25 | 10.2 | 8.0 | 8.7 | 2.1 |

*(meq) = milliequivalent
**This latex contained 33% PVC-PVA and 1% sodium tridecyl sulfate surfactant.

In the results of Table 7, above, the lower pH with the KOH is due to a slower injection rate of KOH during the first two-thirds of the experiment time. The increased rate during the last third of the time built up some KOH in the drum.

EXAMPLE 8
DISTRIBUTION OF NEUTRALIZING CATIONS IN PVC

This example illustrates the in-situ and simultaneous cation replacement of the surfactant in the electrolytically deposited and neutralized PVC.

The practical value of the method of in-situ cation replacement is in the option of tailoring the properties of the PVC such as foamability, thermal stability, moisture sensitivity, and the like. For example, the thermal stability of surfactant containing PVC ranks with the surfactant's cations as follows: $Ba > Mg > Li > Na > K > NH_4$. Thus, while for polymerization, a specific surfactant cation combinations may have to be used, for thermal or other requirements, the cation can be changed during the electrodeposition.

The PVC from the neutralization experiments in Example 7 has been analyzed for the distribution of the cations involved, mainly $Na^+$, $Mg^{2+}$, $K^+$, $Li^+$ and $NH_4^+$.

The table below shows the quantity of these species in ppm.

TABLE 8
Distribution of Neutralizing Cations in PVC

| Elements | Na | Mg | K | Li | NH₃ | Total PPM |
|---|---|---|---|---|---|---|
| In starting PVC | 423* | 94* | | | | 517 |
| In KOH neutralized PVC | 146 | 86 | 318 | | | 550 |
| In LiOH neutralized PVC | 207 | 79 | | 237 | | 523 |
| In NH₄OH neutralized PVC | 351 | 63 | | | 420 | 834 |

*The original Na and Mg contents are calculated.

The applied cations were also present in the latex electrolyte and also in the ultrafiltration (UF) permeate. The permeates contained 9.8, 8.1 and 22.0 ppm of K, Li and NH₃, respectively, indicating that some of these ions had penetrated not only the membrane and the deposited PVC layer but also the UF membrane.

In absence of this method of cation replacement, should such replacement be necessary, the surfactant from the separated PVC (by electrolysis or spray drying) must be removed by extraction with a proper solvent, and the new desired surfactant added back. Most of the surfactant must be dissolved first and the PVC suspended in this solution. This process would return the water also, thus requiring a second PVC separation. To obtain a good distribution of the surfactant many times, a special method such as sonification must be applied. Again, these procedures are costly and time consuming and may adversely affect the quality of the PVC or plastisols made of such PVC.

EXAMPLE 9

ELECTROLYTIC-ULTRAFILTRATION (E-UF) PVC SEPARATION ONTO VARIOUS ANODE COVERINGS

It is evident from the foregoing examples that the combined E-UF process for the separation of PVC, or other suitable particulate matter (e.g., PVC copolymers) from their suspension, has appreciable advantages over the prior art methods of separation.

The following experiments were performed to illustrate additional advantages which allow considerable flexibility in engineering design of equipment and operation. Among the options the operator can choose are:
1. a bare drum or continuous belt anode;
2. a cloth or mesh or an ion exchange membrane to protect the surface of the anode from wear;
3. a cloth or mesh or a membrane as a continuous moving belt from which the PVC is removed at a remote point of the cell; and
4. when using a membrane, it can also be used for the in-situ neutralization of the PVC and in-situ exchange of cations of the surfactants.

The experiments below demonstrate the use of moving belts of dielectric and electrolytically conductive materials such as polypropylene mesh and ion exchange membranes, respectively.

(9-1) PVC Recovery Using Polypropylene Mesh Belt

A PVC-type latex containing 43.3 percent PVC with about 2.11 percent sodium tridecyl sulfate surfactant was subjected to electrolysis at one amp. constant current and 6-5.3 cell potential for 1 hour and 40 minutes. The anode drum, 45 percent of its surface immersed in the latex, served as one of the pulleys and a one-inch diameter Rulon rod as the second pulley. The Rulon pulley was situated about 12 inches from the cell in an approximately 45° elevation. The traveling speed of the belt was about 3 inches/min. The deposited PVC was scraped off just at the down-turn of the belt from the Rulon pulley (FIG. 3). The electrodeposited PVC weighed 262 grams wet and 216 grams dry.

(9-2) PVC Recovery Using Nafion Cation Exchange Membrane Belt

The same type of PVC latex as in experiment (9-1) was electrolyzed at one ampere constant current and 6.3-5.3 V cell potential for one hour. The PVC scraped off the second pulley weighed 224 grams wet and 181 grams dry.

(9-3) PVC Recovery Using Selemion AMV Anion Exchange Membrane Belt

The same type of PVC as used in Experiments (9-1) and (9-2) was electrolyzed at one ampere constant current and 11-11.4 V cell potential for one hour. The separated PVC from the second pulley weighed 235 grams wet and 192 grams dry.

Additional experiments were performed to further illustrate the various modes of operation listed above. These experiments were carried out using:
(9-4) a solid drum anode bare
(9-5) a solid drum anode covered with a polypropylene mesh;
(9-6) a solid drum anode covered with a cation exchange membrane;
(9-7) a mesh drum anode covered with a cation exchange membrane but not used for in-situ neutralization; and
(9-8) a mesh drum anode covered with a cation exchange membrane and used for in-situ neutralization.

The experiments were carried out at the same and constant electric current (i.e., one ampere) using the same type of polyvinyl chloride-polyvinyl acetate copolymer (PVC-PVA) latex and other conditions except those specified above.

The results of the experiments are summarized below in Table 9. The data indicates that the efficiencies are comparable and permit the engineering options without an appreciable sacrifice in production rate. The lower current efficiency in the in-situ neutralization (i.e., Experiment 9-8) is expected since the first part of the current is used up to replace the Na⁺ ion in the soap with the H⁺ ion, and the second part to neutralize the acidic H⁺ ion on the surfactant with the Na⁺ ion supplied from across the membrane.

TABLE 9
Electrolytic-Ultrafiltration (E-UF) PVC Separation Onto Various Anode Coverings

| Experiment No. | Electrolysis in min. | V | Temp., °C. | pH of Latex in Cell | PVC-PVA Obtained, g wet | PVC-PVA Obtained, g dry | PVC-PVA Obtained, g % dry | Applied Charge, amp/hr | Yield g per amp/hr Elect. Charge | Permeate pH |
|---|---|---|---|---|---|---|---|---|---|---|
| (9-4) | 30 | 16-14 | 25 | 8.8-9.4 | 674 | 514 | 76.3 | 1.0 | 514 | 7.5 |

TABLE 9-continued

Electrolytic-Ultrafiltration (E-UF)
PVC Separation Onto Various Anode Coverings

| Experiment No. | Electrolysis in min. | V | Temp., °C. | pH of Latex in Cell | PVC-PVA Obtained, g | | | Applied Charge, amp/hr | Yield g per amp/hr Elect. Charge | Permeate pH |
|---|---|---|---|---|---|---|---|---|---|---|
| | | | | | wet | dry | % dry | | | |
| (9-5) | 30 | 17-13 | 27 | 9.0–9.6 | 725 | 559 | 77.1 | 1.0 | 559 | 8.9 |
| (9-6) | 30 | 16-27 | 25 | 9.0–9.4 | 669 | 514 | 76.9 | 1.0 | 514 | 7.75 |
| (9-7) | 36 | 22-15 | 23 | 5.0–9.5 | 798 | 618 | 77.5 | 1.2 | 515 | 7.5 |
| (9-8) | 50 | 13-10 | 26 | 9.0–9.8 | 752 | 583 | 77.6 | 1.67 | 349 | 9.35 |

EXAMPLE 10

EFFECT OF CURRENT DENSITY (CD) AND PVC CONTENT IN LATEX ON RATE OF ELECTROLYTIC (E) RECOVERY OF PVC

In order to determine the effect of current density (CD) on the rate of electrolytic (E) recovery of PVC, latices were electrolyzed at different current densities (CD). The surfactants used in the experiments (i.e., Experiments FF and GG) were different. The results of the electrolysis of the latices are provided below in Table 10.

TABLE 10

Effect of Current Density (CD)
On Electrolytic (E) PVC Recovery

| Experiment (Surfactant) | CD (mA/in$^2$) | Recovered PVC (g) |
|---|---|---|
| FF (SLS) | 5 | 9.4 |
| | 10 | 17.9 |
| | 15 | 29.3 |
| GG (Brij-30) | 5 | 13.3 |
| | 10 | 30.7 |
| | 15 | 46.5 |

As shown in the results of Table 10, as the current density (CD) increases, a greater amount of PVC is recovered.

In a manner similar to that discussed above, the effect of the PVC content in latex on the electrolytic (E) recovery of PVC was determined by electrolyzing latices of different PVC content at the same current density (CD).

In this experiment, the PVC content of a latex containing 35 percent initial PVC was reduced by incremental dilution, and the resulting batches were electrolyzed under identical conditions at 60 mA/inch$^2$ current density (CD).

The results of the experiments are recorded below in Table 11. The results record the rate of separation, i.e., recovery, of PVC per faraday.

TABLE 11

Effect of PVC Content In Latex
On Electrolytic (E) PVC Recovery

| Percent PVC in Latex | 10 | 15 | 20 | 25 | 30 | 35 |
|---|---|---|---|---|---|---|
| PVC (g.) Recovered/Faraday | 1206 | 2171 | 3281 | 4593 | 5741 | 6706 |

As can be seen in the results of Table 11, with a larger PVC content in the latex, the greater the PVC recovery.

EXAMPLE 11

ELECTROLYTIC PVC RECOVERY WITH A MOVING BELT ANODE

In this experiment, the electrolytic system illustrated in FIG. 4 was used. The advantages of the geometry of this electrolytic system are that a greater portion of the surface of the anode can be immersed and utilized for PVC separation, the anode requires a relatively smaller latex container, and a multiplication of the belt anode unit can be constructed into one latex container or several belt anode units can be connected to form one moving belt anode with several rising and immersing sections.

The anode was an endless stainless steel mesh belt. The centers of the lower and upper pulley were about 24 inches apart. The diameter of the lower pulley was 9 inches and that of the upper pulley 3 inches. The lower one-foot length of the belt was immersed in the PVC latex. The inner side of the anode was insulated to prevent the deposition of PVC on that side. The active anode surface area facing the cathode was 74 sq. in. The cathode, made of expanded titanium sheet, was situated parallel to the anode at a distance of ¾ inch.

The adjustable speed of the anode was set at 2 in./min. The latex contained 53 percent PVC and was electrolyzed at 2 amperes constant current and 8.3–8.8 V cell potential (CD 27 mA/inch$^2$). The thickness of the deposited layer was about 3/32 inch and has not fallen off the anode when turned under the lower pulley. Preliminary experiments indicated that the thicker the PVC deposit the larger the diameter of the lower pulley must be. The deposited PVC was scraped off the belt at the upper pulley on the down-turn side.

A 20-minute electrolysis separated 278 grams of wet PVC which, when dried, weighted 195 grams.

EXAMPLE 12

The following experiments (i.e., Experiments 12-1, 12-2 and 12-3) illustrate the various materials, and coatings which can be used as anodes in the present electrolytic ultrafiltration (E-UF) PVC separation process.

(12-1) MnO$_2$ Coated Solid Ti Drum Anode

A plant latex containing 42 percent PVC with sodium tridecyl sulfate soap was used for this experiment.

No ultrafiltration was applied.

The electrolysis was carried out at 1.4 ampere constant current and 14 to 9.8 V. After the 2-hour and 20-minute operation, the PVC which was obtained and dried weighed 1545 grams, or 3.21 pounds. The consumed electricity was 3.27 amp-hr. The current efficiency is approximately 1 lb/amp-hr.

The PVC was analyzed and found to contain 3.2 ppm of Mn.

(12-2) MnO$_2$ Coated Mesh Drum Anode Covered With Nafion

Plant PVC with a 38 percent solid content was used in this experiment.

The drum anode was made of mesh and was covered with a Nafion membrane. During the process, the permeate from the ultrafiltration (pH 11.5) was led through the inside of the anode to see whether the base in the permeate could be utilized for an in-situ neutralization of the deposited PVC. The pH of the deposited PVC was at 3.3–4.6. Thus, the neutralization with the alkaline permeate could not be accomplished because of the much higher acid generation in the anode than the supply of base by the permeate.

The electrolysis was carried out at a constant current of 2 amperes for 1 hour and 15 minutes. The separated PVC was 542 grams wet, approximately 424 grams dry=0.933 pound. The cell voltage was 11.5–9.1. Current efficiency 0.373 lb/amp-hr.

(12-3) MnO$_2$ Coated Mesh Drum Anode Covered With a Filter Cloth

In this experiment, a glass filter cloth was used to cover the MnO$_2$ coated mesh drum anode. The latex obtained from a pilot run contained 0.74 percent, a mixed surfactant of about 0.53 percent sodium lauryl sulfate (SLS), and 0.21 percent magnesium lauryl sulfate (mgLS). The PVC solid content in the latex was 24 percent.

The electrolysis was conducted at one ampere constant current and the cell potential varied between 10 and 8.9 V. In a one-hour processing, the PVC obtained was 450 grams wet, 339 grams dry=0.748 pound. Current efficiency: 0.75 lb/amp-hr.

The experiment was continued under the same conditions except a vacuum was applied to the interior of the drum electrode. The purpose was to see whether a filtration would be possible while also electrodepositing the PVC. A moderate increase (17 percent over electrolysis alone) in PVC deposition was realized. The filtrate, however, was not clear due to some PVC content.

EXAMPLE 13

PAPER SLUDGE DE-WATERING

In this example, the use of the process of the present invention to de-water paper sludge is demonstrated. For this experiment, a TIR-2000 coated mesh drum electrode was covered with a filtering cloth. The cathode was a mesh Ti (expanded) strip about 1 centimeter away from the drum anode concentric with the anode. The apparatus was basically the same used in the previous examples for the recovery of PVC solids except an ultrafiltration unit is not employed. A DC current was supplied from a power source while the sludge was agitated by air sparging.

Electrolysis of the paper sludge was commenced and the amperage was increased from 0.7 amps to 0.85 amps over a period of 10 minutes. The filtering cloth covering the anode became initially coated with sludge but there was no further deposition of sludge particles on the anode with time, i.e., there was no increase in the thickness of the coating on the filtering cloth with an increase in time.

A vacuum was then applied to the electrolytic cell to draw sludge fluids through the filtering cloth to the interior of the drum anode. The application of the vacuum while electrolyzing was continued for an additional 50 minutes. The solid particulate contained in the sludge composition continuously deposited on the rotating drum anode and was continuously recovered during this time.

The net solid recovery weighed 381 grams and the filtrate removed was 950 ml.

A 120-gram portion of the wet recovered solid was placed into an oven to dry at 115° C. over a weekend. The dried sludge sample weighed 52 grams. Therefore, the de-watered sludge dry content was 43.3 percent. This compares with the solids concentration in the initial unprocessed sludge as follows:

The total amount of the processed sludge was:

| Solid | 381 g |
|---|---|
| Filtrate | 950 ml |
| Approx. total wgt. | 1331 g |

The dry material being 381/120×52=165.1 g or 12.4 percent solids in the unprocessed sludge.

EXAMPLE 14

DE-WATERING PAPER SLUDGE USING THE EMBODIMENT DEFINED IN FIG. 5

In this example, paper sludge is de-watered as described in the previous Example 13. The only difference is that the apparatus utilized is the one defined in FIG. 5 where the cathode is interior to the anode. The elements or components of the apparatus are the same as described in Example 13 above and the same procedure is used as set out in Example 13 above. A vacuum is applied (note Examples 12 and 13) 10 minutes after the electrolysis is commenced. The solid sludge particulate is readily deposited on the anode and is recovered as described in Example 13 above. The results of this experiment are essentially the same as in Example 13.

What is claimed is:

1. An apparatus for the recovery of suspended solids from a liquid medium contained within a tank, said apparatus consisting essentially of:
   (A) a continuous surface anode adapted to be located within said liquid medium contained within said tank;
   (B) a cathode adapted to be located within said liquid medium contained in said tank and adjacent to said anode;
   (C) a power source arranged to provide direct current in a continuous or interrupted mode by connector means to said anode and said cathode;
   (D) means for removing said suspended solids following electrolytic deposition on the surface of said anode;
   (E) an inlet disposed in said tank and connected to a source of additional liquid medium;
   (F) an outlet disposed on said tank and connected to an ultrafiltration unit having an inlet and an outlet and filtrate removal means, and piping leading from said ultrafiltration unit outlet and returning to a second inlet means in said tank;

whereby suspended solids are to be removed from said liquid medium by deposition on said anode when current is applied and solvent is removed through said ultrafiltration unit while the level of said liquid medium within said tank is to be maintained relatively constant by the supply of additional liquid medium from said source.

2. The apparatus of claim 1 wherein said anode is a cylindrical drum form anode formed of a valve metal material and a conductive coating applied thereto.

3. The apparatus of claim 2 wherein the conductive coating is $MnO_2$.

4. The apparatus of claim 2 wherein a film material is wrapped around said drum form anode, said film being an ion exchange membrane or a filter cloth.

5. The apparatus of claim 2 wherein said drum form anode comprises an open mesh valve metal material having a conductive coating applied thereto and a film material wrapped around said drum form anode, said film being an ion exchange membrane.

6. The apparatus of claim 5 wherein the conductive coating is $MnO_2$.

7. The apparatus of claim 5 wherein said ion exchange membrane is a cation exchange membrane.

8. The apparatus of claim 5 wherein said film material is a polymeric electroconductive material wrapped around said drum form anode to protect the anode surface, provide for in-situ neutralization of acidic suspended solids deposited on said anode surface and provide for in-situ replacement of cations present in said suspended solids deposited on the anode surface.

9. The apparatus of claim 5 wherein a pulley means is disposed away from said drum form anode and said film of conductive material extends around a portion of said drum form anode and said pulley means in a continuous loop.

10. The apparatus of claim 1 wherein said anode is a movable belt anode and formed of a flexible metal plate having a conductive coating applied thereto.

11. The apparatus of claim 10 wherein said conductive coating is $MnO_2$.

12. The apparatus of claim 10 wherein said coated flexible metal plate is covered with a polymeric material which is an ion exchange membrane.

13. The apparatus of claim 10 wherein said moveable belt anode is a flexible, open mesh metal having a conductive coating thereon.

14. The apparatus of claim 13 wherein said conductive coating is $MnO_2$.

15. The apparatus of claim 13 wherein said flexible, open mesh metal is covered with a polymeric material which is an ion exchange membrane.

16. The apparatus of claim 1 wherein the cathode is located interior to the drum form anode.

17. A process for the recovery of suspended solids from a liquid medium consisting essentially of:
   (a) feeding said liquid medium containing suspended solids into an electrolytic unit connected to an ultrafiltration unit;
   (b) electrolyzing the liquid medium to effect the removal of suspended solids by deposition on a rotating, drum form electrode or a moving belt electrode and wherein at least a portion of said liquid medium containing solids from the electrolytic unit is circulated through said ultrafiltration unit to maintain a relatively constant suspended solids concentration in said electrolytic unit; and
   (c) recovering said deposited suspended solids on said rotating drum form electrode or said moving belt electrode for reuse.

18. The process of claim 17 wherein the particle size distribution of the deposited solids is the same as that of the suspended solids of said liquid medium.

19. The process of claim 17 wherein the liquid medium fed to the ultrafiltration unit contains about 5–60% suspended solids and the liquid medium fed to said tank contains about 5–60% suspended solids.

20. The process of claim 17 wherein said recovery of suspended solids is continuous and effected by scraping said deposited suspended solids from said electrode.

21. The process of claim 17 wherein said suspended solids are PVC, PVC copolymers, paper sludge material or whey protein.

22. The process of claim 17 wherein said liquid medium is an aqueous emulsion and contains 5 to 45 percent suspended solids which is fed first to the ultrafiltration unit of said system.

23. The process of claim 17 wherein the liquid medium is an aqueous emulsion which contains 35 to 60 percent suspended solids and is fed first to the electrolytic cell of said system.

24. The process of claims 22 or 23 wherein the emulsion contains a surfactant in the amount of from 0.3 to 5.0 percent, by weight.

25. The process of claims 22 or 23 wherein the emulsion has a pH of 3 to 12 and is circulated through said electrolytic-ultrafiltration system at a temperature of 0° to 90° C.

* * * * *